Figure 1:
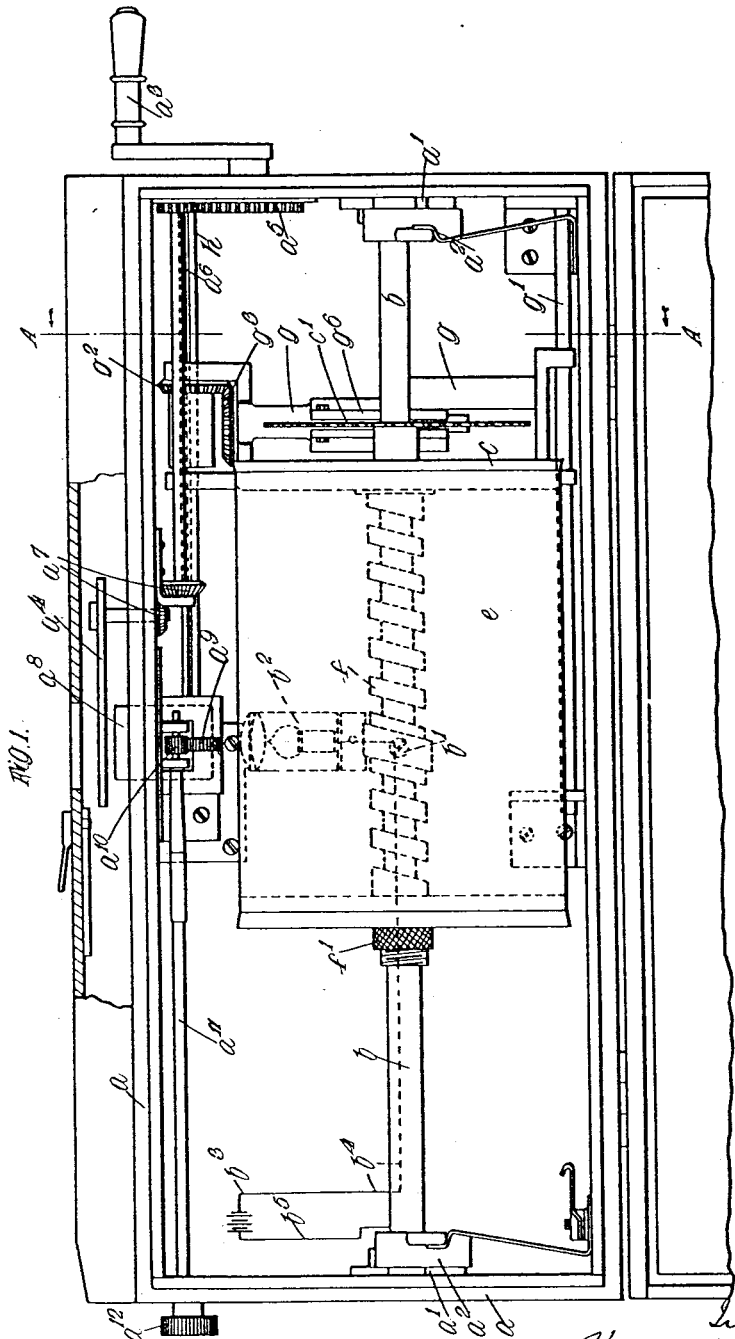

T. H. BOLAM & S. N. BARNARD.
KINEMATOGRAPHIC APPARATUS.
APPLICATION FILED MAR. 25, 1913.

1,116,377.

Patented Nov. 10, 1914.

T. H. BOLAM & S. N. BARNARD.
KINEMATOGRAPHIC APPARATUS.
APPLICATION FILED MAR. 25, 1913.

1,116,377.

Patented Nov. 10, 1914.
5 SHEETS—SHEET 2.

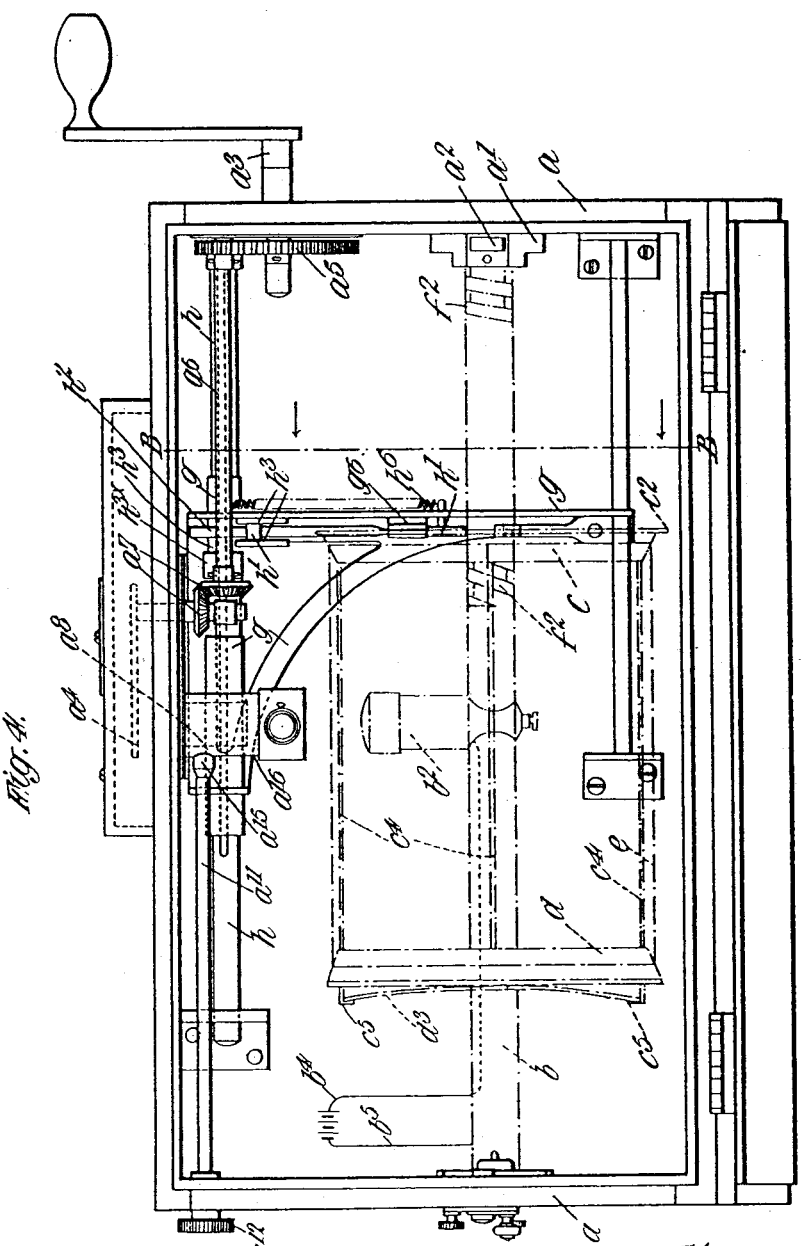

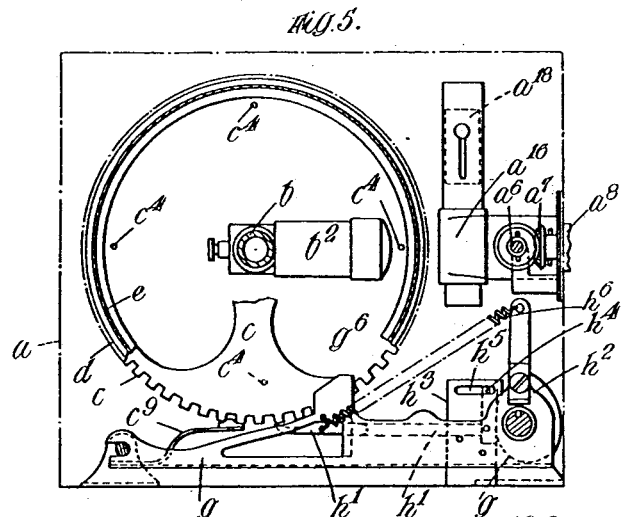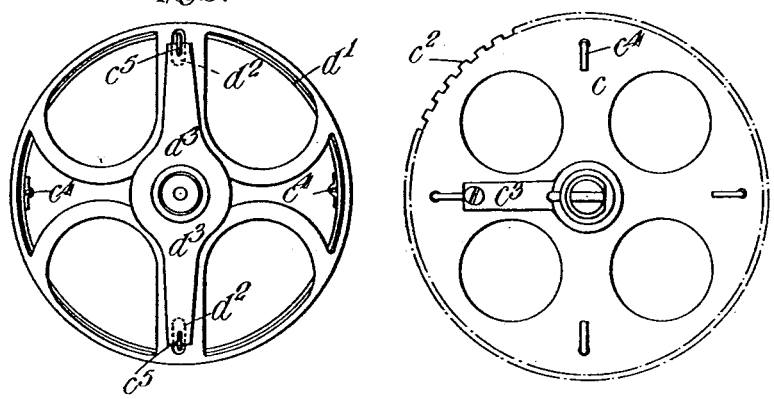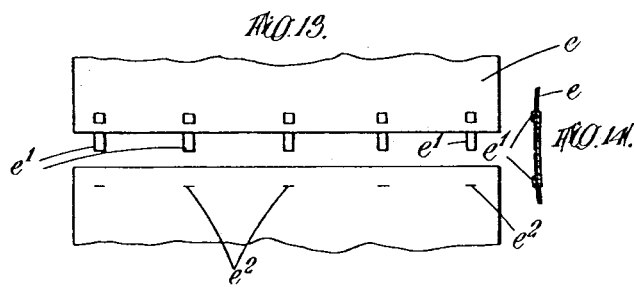

T. H. BOLAM & S. N. BARNARD.
KINEMATOGRAPHIC APPARATUS.
APPLICATION FILED MAR. 25, 1913.
1,116,377.
Patented Nov. 10, 1914.
5 SHEETS—SHEET 5.
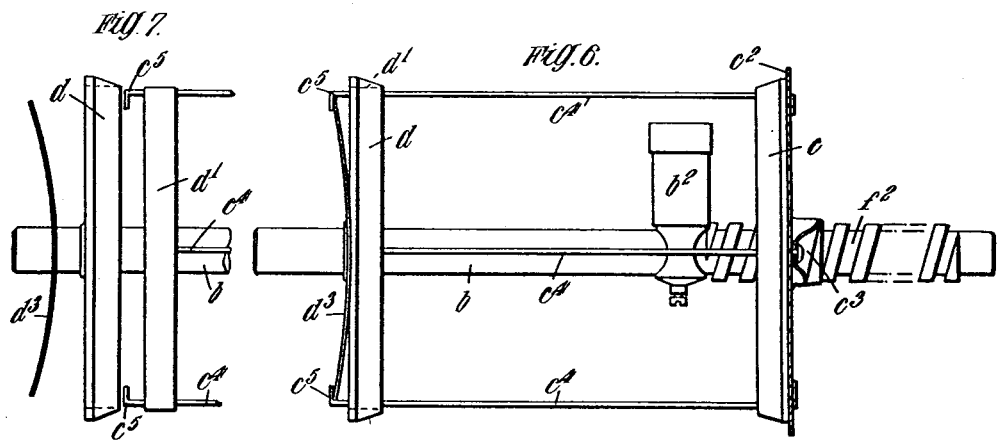
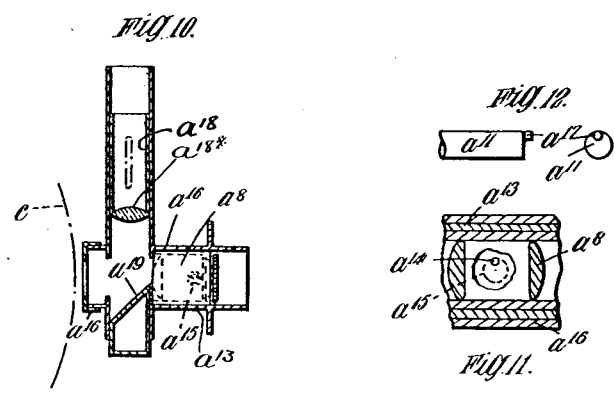

UNITED STATES PATENT OFFICE.

THOMAS HORACE BOLAM AND SIDNEY NORMAN BARNARD, OF WEST EALING, ENGLAND.

KINEMATOGRAPHIC APPARATUS.

1,116,377.  Specification of Letters Patent.  Patented Nov. 10, 1914.

Application filed March 25, 1913. Serial No. 756,678.

*To all whom it may concern:*

Be it known that we, THOMAS HORACE BOLAM and SIDNEY NORMAN BARNARD, both subjects of the King of Great Britain, residing at 173 Uxbridge road, West Ealing, in the county of Middlesex, England, have invented certain new and useful Improvements in or Relating to Kinematographic Apparatus, of which the following is a specification.

This invention relates to kinematographic apparatus of the kind wherein a cylindrical drum carrying a film or the like in a rigid manner is intermittently rotated around and longitudinally moved past a lens, so that a helical path of photographs can be taken on the film and afterward viewed or projected with a kinematographic effect.

The chief object of the present invention is to simplify and cheapen the construction of such apparatus and to render the same more suitable for projecting the photographs onto a screen than has heretofore been possible.

According to this invention the film or the like is supported in a cylindrical manner by a suitable device or devices engaging the open ends of the cylindrically formed film. For this prpose the film is supported in its cylindrical form upon and between two members which are so arranged as to constitute a rigid structure or skeleton drum capable of being rotated and simultaneously moved in a longitudinal direction. In this manner the film is supported only at its ends and thus the "projecting" lamp can be arranged in a fixed position opposite the lens and between the film supporting members so as to permit the necessary longitudinal movement of the film supporting members to take place. The film supporting members are detachably connected together so that they can be separated to enable the film to be readily placed in position or removed as desired. For this purpose one of the film supporting members is fixed to a sleeve or the like to which the other film supporting member is adapted to be detachably connected the said sleeve being mounted on a stationary shaft and provided with a helical groove with which engages a pin or the like on the said shaft so that when the film supporting members are rotated they are simultaneously moved longitudinally along the shaft. In a modification the said film supporting members are connected together through the intervention of suitable rods and a fastening device, and in this case one of the said members is provided with a projection which engages with a helical groove formed in the stationary shaft, so that the longitudinal movement of the members can be obtained. The two film supporting members are provided with beveled or inclined peripheries or surfaces which serve as wedges so that when the two members are adjusted toward each other, they engage with the ends of the cylindrical film and hold the same firmly in position.

The mechanism for effecting the rotation of the film supporting members which as aforesaid constitute a film drum, is operatively connected with the drum in such a manner that it moves longitudinally with the same and consequently always remains in engagement therewith. For this purpose, in one construction suitable gearing actuated by the usual operating handle with which the apparatus is provided, is carried by a sliding frame movable with the film drum and is adapted to rotate a worm or cam device which engages with a worm wheel or other toothed wheel attached to one of the film supporting members. The worm or cam device is so formed that an intermittent rotation is imparted to the film drum by the continuous rotation of the said worm or cam device. Instead of employing a continuously rotating worm or cam device engaging with a worm wheel or the like on the film supporting member as aforesaid, we may use a reciprocating pawl adapted to engage with teeth on the film drum which pawl is carried on the sliding frame, and is actuated by a rotatable cam that is also mounted so as to travel longitudinally with the drum.

Mechanism is provided for adjusting or focusing the lens mounted in an appropriate manner in a casing which also carries a view finder.

The film is originally in the form of a strip and at one end is provided with suitable clips or fastening devices which are adapted to engage with slots or the like in the other end of the strip.

In order that the said invention may be clearly understood and readily carried into effect, we will describe the same more fully with reference to the accompanying drawings in which—

Figure 2:
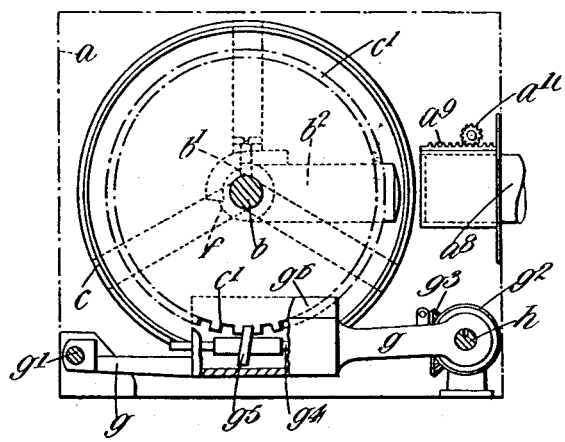
Figure 3:
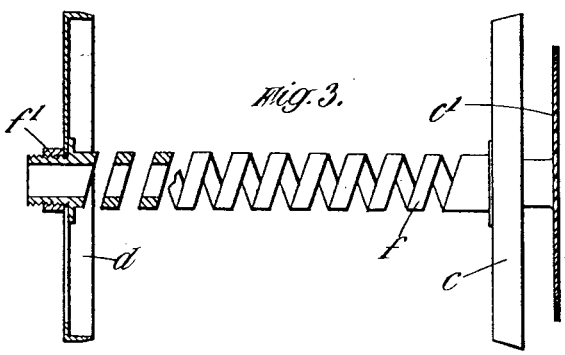

Figure 1 is a plan view of one construction of the improved apparatus. Fig. 2 is a sectional view taken on the line A—A of Fig. 1 showing more particularly the mechanism for imparting rotary movement to the drum. Fig. 3 is a view of the film supporting members shown in Fig. 1, illustrating the manner in which they are connected together. Fig. 4 is a plan view of a modified construction of the apparatus. Fig. 5 is a sectional view taken on the line B—B of Fig. 4. Fig. 6 is a plan view of the film supporting members shown in Fig. 4 illustrating the manner in which they are connected together. Fig. 7 is a view of one of the film supporting members (and appertaining parts) disconnected from the other member. Figs. 8 and 9 are end views of the film supporting members shown in Fig. 6. Figs. 10, 11 and 12 illustrate details of the view finder and focusing device shown in Fig. 4. Figs. 13 and 14 are detail views illustrating one way of connecting the ends of the film strip.

Like letters of reference denote similar parts in all the figures.

$a$ is the usual hinged box or casing of the apparatus; $b$ is the stationary shaft detachably mounted in suitable sockets $a'$ $a'$ attached to the casing, the shaft being held in position by spring controlled retaining devices $a^2$ $a^2$. The usual operating handle $a^3$ is provided, and is adapted to actuate the rotating shutter $a^4$ arranged adjacent to the lens $a^8$ in the front part of the box or casing through suitable toothed gearing $a^5$, the shaft $a^6$ and bevel gearing $a^7$.

$c$ and $d$ represent the film supporting members around which the film $e$ is held as shown in Fig. 1. In the example shown in Figs. 1 to 3, the film supporting member $c$ is rigidly secured to one end of a helical coil or sleeve $f$ which is capable of longitudinal displacement on the stationary shaft $b$. The other end of the helical coil or sleeve is adapted to receive the film supporting member $d$ in such a manner that it is centrally mounted thereon and retained in position by a nut $f'$ engaging a threaded portion of the said coil or sleeve $f$ (see Fig. 3). The two film supporting members $c$ and $d$ are provided with beveled or inclined surfaces, so that they enter the ends of the cylindrical film and serve as circular wedges to rigidly support the film in a true cylindrical formation. The two members when connected together as aforesaid, constitute what may be termed a skeleton drum which can be rotated around and longitudinally moved along the stationary shaft $b$.

The mechanism for imparting rotation to the drum is carried on a frame $g$ slidably mounted on a rotary shaft $h$ and a guide shaft or bar $g'$. The said mechanism in the example shown in Figs. 1 and 2 comprises bevel wheels $g^2$ and $g^3$ the former $g^2$ being mounted on the rotary shaft $h$ so as to revolve therewith and also slide upon the same by means of a key and keyway connection, the other bevel wheel $g^3$ being secured to a spindle or shaft $g^4$ carrying a worm or cam device $g^5$ which meshes or engages with a worm or other toothed wheel $c'$ rigidly attached to the film supporting member $c$. The worm or cam device $g^5$ is so formed that when engaging with the worm wheel or the like $c'$ and during a portion of its rotation it will not cause a rotation of the worm wheel. In this manner an intermittent rotation can be imparted to the drum by the continuous rotation of the worm $g^5$ through the bevel gear wheels $g^2$ $g^3$ and the shaft $h$ which latter is connected through the gearing $a^5$ to the operating handle. The necessary and simultaneous longitudinal movement is imparted to the film drum in the example shown in Fig. 1 by means of a projection or pin $b'$ on the stationary shaft $b$ engaging with the aforesaid helical coil or sleeve $f$. The worm wheels $c'$ is arranged to rotate in a slotted portion $g^6$ of the sliding frame so that as the drum moves longitudinally the sliding frame will also be moved longitudinally on the shaft $h$ and guide rod $g^7$.

An electric "projecting" lamp and lens are mounted in a casing $b^2$ which is secured to the shaft and preferably by the pin $b'$ which engages the helical coil as aforesaid. The lens $a^3$ is preferably frictionally held in a sleeve which can be adjusted to focus the lens by means of a rack $a^9$ on the sleeve and a pinion $a^{10}$ engaging therewith, which pinion is mounted on a shaft $a^{11}$ that is rotated by a milled head or knob $a^{12}$ on the exterior of the casing.

The electric current may be supplied to the lamp from a suitable battery or accumulator $b^3$ from which a conducting wire $b^4$ passes through the stationary shaft to connect with the lamp, the current being returned through the metal of the shaft which is connected by a wire $b^5$ to the battery $b^3$. The lens $a^8$ can be mounted so that it may be substituted by an eyepiece, when the pictures are to be "observed". When "observing", an electric lamp is arranged in a suitable position to illuminate the pictures as they pass the eyepiece and a switch may be provided on the box or casing for completing the circuit for either the "projecting" lamp or the "observing" lamp, and also for breaking both the said circuits.

In the modification shown in Figs. 4 to 9, ratchet and pawl gearing is employed for effecting the rotation of the drum and various other alterations are made, but the general construction and working of the apparatus remain the same as in the modification shown in Figs. 1 to 3 so that a further description of some of the similar or equivalent parts will not be given. The pawl $h'$ is loosely mounted on the sliding frame $g$ and is so shaped at its rear end as to be engaged by a cam $h^2$ forming part of a sleeve $h^3$ which is mounted on the rotary shaft $h$ so as to turn therewith as well as to slide upon the same by means of a key and keyway connection. The cam sleeve is also situated between two parts of the sliding frame $g$ so that when the latter is moved it also moves or slides the cam along the said rotary shaft. The pawl $h'$ is held in position between two upstanding parts of the frame (see $h^3$ Fig. 4) by a pin $h^4$ on the pawl working in slots $h^5$ in the upstanding parts $h^{3*}$ and the said pawl is retained in engagement with its operating cam by a spring $h^6$ connected to the forward end of the pawl and to a fixed part of the sliding frame. The pawl engages with teeth $c^2$ provided on the periphery of the film supporting member $c$ and for each revolution of the cam $h^2$, the pawl $h'$ is moved forward and turns the film supporting member to the extent of one tooth. The pawl in moving backward under the influence of the spring is depressed against the resistance of the spring in sliding over or slipping the next ratchet tooth. A spring retaining device $c^9$ engaging the ratchet teeth $c'$ holds the film supporting member stationary when the latter is not being moved by the pawl; and the pawl may be so shaped as to come into contact with a fixed pin or the like when moved by the cam, to prevent the pawl from turning the film supporting member more than the extent of one tooth for each revolution of the cam. In this modification of the apparatus, the stationary shaft $b$ is provided with a helical slot or groove $f^2$ and the film supporting member $c$ is provided with a tongue $c^3$ or the like (see Figs. 6 and 9) which projects into the said groove in order that when the said member is rotated, it is also longitudinally displaced on the shaft. The tongue $c^3$ is in the form of a spring and bears against the side wall of the groove $f^2$ so as to prevent longitudinal play between the shaft and the film supporting member $c$. The film supporting member $c$ is connected to the sliding frame $g$ by reason of ratchet teeth on its periphery rotating in the slotted portion $g^6$ on the frame.

The film supporting member $d$ in the example shown in Figs. 4–9 is detachable connected to the film supporting member $c$ through the intervention of longitudinal rods $c^4$ secured to the member $c$. The free ends of the rods are secured to a circular ring $d'$ which constitutes the support or seating for the detachable member $d'$ and the member $d$ may be provided with diametrically opposite slots $d^2$ for the reception of the free ends of a pair of the rods $c^4$, these ends being bent as shown $c^5$ or otherwise suitably formed so that when the member $d$ is in position on its seating ring $d'$ it can be retained by a spring or resilient device $d^3$ engaging the said member $d$ and the aforesaid bent ends of the rods. The film supporting members are thus securely connected together, and they support film in the manner previously described with reference to the apparatus shown in Fig. 1.

The electric "projecting" lamp casing $b^2$ is secured to the shaft in an appropriate manner and the electric current to the lamp may be supplied, as aforesaid. The lens $a^8$ may be adjusted for focusing by the rack and pinion gearing, but in the example shown in Figs. 4, 10, 11 and 12, the adjustment of the lens may be effected in a somewhat different manner, by detachably mounting the lens $a^8$ in the sleeve $a^{13}$ which is provided with a hole $a^{14}$, arranged to occupy a position opposite a circular opening $a^{15}$ in the tubular member $a^{16}$ containing the sleeve $a^{13}$. The extremity of the shaft $a^{11}$ fits into the circular opening $a^{15}$ and is provided with an eccentrically disposed pin or projection $a^{17}$ (see Fig. 12) which fits into the hole $a^{14}$ in the sleeve so that when the rod is rotated the sleeve is moved backward and forward by the eccentric pin 17 to obtain the desired adjustment. The tubular member $a^{16}$ is also adapted to carry a view finder which is provided with a suitable lens or glass $a^{18\times}$ secured in an adjustable sleeve or eye-piece $a^{18}$ and arranged immediately above the mirror $a^{19}$ situated as shown in Fig. 10. The object to be photographed can be focused on to the mirror $a^{19}$ when the film $e$ is in position, see Fig. 10, and it can be observed on the lens or glass $a^{18\times}$ in the eye-piece through a suitable aperture in the lid of the casing $a$, which aperture can be closed by a movable cover plate not shown.

Before the film is placed on the supporting members $c$ $d$ it is in the form of a strip or band the free ends of which must be connected together to obtain the endless or cylindrical formation. One way of accomplishing this is shown in Figs. 13 and 14, wherein $e$ represents the film strip one end of which is provided with metal tabs $e'$ which can be inserted in slits $e^2$ or the like in the other end of the film strip and then bent or turned over to retain or connect the ends of the film strip, as shown in Fig. 14.

Although the shaft $b$ which supports the film drum is referred to as being stationary, it may be so mounted that it is capable of being longitudinally moved to a limited extent to enable the pictures on the film or the like to be registered correctly with the opening or lens through which they are to be "observed" or "projected." For this purpose the said shaft may be screw threaded at one end to engage a threaded bush or the like, so that on slightly rotating the shaft by a suitable exterior handle, it can be moved longitudinally to the desired extent. The shaft is otherwise held stationary to enable the longitudinal movement of the drum to be effected as aforesaid.

What we claim and desire to secure by Letters Patent of the United States is:—

1. Kinematographic apparatus comprising in combination, means for engaging with the edges of a cylindrically formed film to support the film rigid, and mechanism for rotating and simultaneously moving said supporting means in a longitudinal direction.

2. Kinematographic apparatus comprising in combination, two co-axial film supporting members engaging with the edges of a cylindrically formed film to maintain the latter rigid, means for detachably connecting said members, and means for simultaneously rotating and longitudinally moving the said film supporting members when they are connected together.

3. Kinematographic apparatus comprising in combination, a film supporting means engaging with the edges of a cylindrically formed film to maintain the latter rigid, teeth on said means, an actuating device engaging said teeth to rotate said means, and mechanism for longitudinally moving said film supporting means and said actuating device.

4. Kinematographic apparatus comprising in combination, a longitudinally stationary shaft, a film supporting means movably mounted on said shaft and engaging with the edges of a cylindrically formed film to maintain the latter rigid, teeth on said means, an operating shaft parallel to said stationary shaft, an actuating device for engaging said teeth slidably mounted on said operating shaft, gearing for actuating said operating shaft, and mechanism for moving said film supporting means and the actuating device along said shafts.

5. Kinematographic apparatus comprising in combination, means for engaging with the edges of a cylindrically formed film to maintain the latter rigid, mechanism for rotating and simultaneously moving said supporting means in a longitudinal direction, and a stationary projecting lamp arranged between the edges of said film.

6. Kinematographic apparatus comprising in combination, two film supporting members, means for detachably connecting said members, inclined surfaces on said members adapted to engage the edges of a cylindrically formed film to maintain the latter rigid, and means for simultaneously rotating and longitudinally moving said members when they are connected together.

7. Kinematographic apparatus, comprising two film supporting members engaging with the edges of a cylindrically formed film to maintain it rigid, connecting means secured to one of them and adapted to receive the other of said members, a contrivance for securing said second mentioned member in position, means engaging one of said members to rotate the two of them, and mechanism for longitudinally moving said members.

8. Kinematographic apparatus comprising in combination, two annular film supporting members engaging with the edges of a cylindrically formed film to maintain it rigid, a plurality of thin rods secured to one of said members, a seating secured to said rods and adapted to receive the other of said members, a device for engaging said rods to retain said second member on said seating, and mechanism for simultaneously rotating and longitudinally moving said film supporting members when connected together.

9. Kinematographic apparatus comprising in combination, a rotatable film supporting means for engaging with the edges of a cylindrically formed film to maintain the latter rigid, a peripheral toothed portion on said means, a longitudinally slidable frame provided with a slotted part adapted to receive said toothed portion, an actuating device for engaging said teeth and carried by said frame, and mechanism for longitudinally moving said film supporting means and said slidable frame.

10. Kinematographic apparatus comprising in combination, a longitudinally movable film supporting means engaging with the edges of a cylindrically formed film to maintain the latter rigid, teeth on said means, a rotating shaft, a frame slidably mounted on said shaft, a pawl carried by said frame engaging said teeth, an operating cam engaging said pawl slidably mounted on and rotated by said shaft, and mechanism for longitudinally moving said film supporting means and the sliding frame.

11. Kinematographic apparatus comprising in combination, means for engaging with the edges of a cylindrically formed film to maintain the latter rigid, mechanism for rotating and simultaneously moving said supporting means in a longitudinal direction, and a view finder device having an aperture arranged close to said film to coöperate with said film to enable the picture to be seen in the view finder.

12. Kinematographic apparatus comprising in combination, means engaging with the edges of a cylindrically formed film to maintain it rigid, mechanism for rotating and simultaneously moving said supporting means in a longitudinal direction, a view finder having an aperture arranged close to said film to coöperate with said film to enable the picture to be seen in the view finder, and a "taking" or "projecting" lens adapted to be held in said view finder device.

13. Kinematographic apparatus comprising in combination, means for engaging with the edges of a cylindrically formed film to maintain the latter rigid, mechanism for rotating and simultaneously moving said supporting means in a longitudinal direction, a view finder device having an aperture arranged close to said film to coöperate with said film to enable the picture to be seen in the view finder, a "taking" or "projecting" lens adapted to be held in said view finder device, a casing for a lens mounted in said view finder, and means for adjusting said lens casing.

14. Kinematographic apparatus comprising in combination, a strip film provided with means at its extremity for retaining said film in a cylindrical form, and two film supporting members for engaging with the edges of a cylindrically formed film to maintain it rigid.

In testimony whereof we affix our signatures in presence of two witnesses.

THOMAS HORACE BOLAM.
SIDNEY NORMAN BARNARD.

Witnesses:
HAROLD A. SMITH,
T. SELBY WARDLE.

Copies of this patent may be obtained for five cents each, by addressing the "Commissioner of Patents, Washington, D. C."